United States Patent
Eck et al.

(10) Patent No.: US 7,140,163 B2
(45) Date of Patent: Nov. 28, 2006

(54) BLISTER-FOIL PACKAGING MACHINE

(75) Inventors: Werner Eck, Laupheim (DE); Detlev Gertitschke, Laupheim (DE); Wolfgang Rodi, Baustetten (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 112 days.

(21) Appl. No.: 10/964,586

(22) Filed: Oct. 13, 2004

(65) Prior Publication Data

US 2005/0081485 A1  Apr. 21, 2005

(30) Foreign Application Priority Data

Oct. 15, 2003  (DE) ................ 103 47 775

(51) Int. Cl.
*B65B 7/00* (2006.01)

(52) U.S. Cl. ........................ 53/329; 53/389.1

(58) Field of Classification Search ............ 53/329, 53/329.4, 339, 340, 354, 389.1, 389.2, 389.3; 74/102, 103, 105; 100/215, 46, 258 R, 258 A, 100/281, 282, 286

See application file for complete search history.

(56) References Cited

U.S. PATENT DOCUMENTS

| | | | | |
|---|---|---|---|---|
| 3,703,066 A | * | 11/1972 | Marion et al. ............ 53/296 |
| 3,772,986 A | * | 11/1973 | Kawagoshi et al. ...... 100/282 |
| 3,808,772 A | * | 5/1974 | Turtschan ................ 53/141 |
| 4,329,830 A | | 5/1982 | Omori |
| 4,400,984 A | * | 8/1983 | Ronbeck ................. 74/103 |
| 4,490,961 A | * | 1/1985 | Raque ................... 53/329.4 |
| 4,563,860 A | * | 1/1986 | Pfankuch ................ 53/450 |
| 4,892,019 A | | 1/1990 | Kogane |
| 5,269,123 A | * | 12/1993 | Marchesini ............. 53/559 |
| 5,802,804 A | | 9/1998 | Esposti |
| 6,085,497 A | * | 7/2000 | Natterer ................. 53/559 |
| 6,148,720 A | * | 11/2000 | Yoshida ................. 100/257 |
| 6,745,638 B1 | * | 6/2004 | Godtner ................. 74/55 |
| 6,945,165 B1 | * | 9/2005 | Nagae .................. 100/280 |

* cited by examiner

*Primary Examiner*—Stephen F. Gerrity
*Assistant Examiner*—Hemant M. Desai
(74) *Attorney, Agent, or Firm*—Andrew Wilford

(57) ABSTRACT

A lower foil formed with upwardly open filled pockets passes horizontally at a constant transport speed through a work station of a machine frame. A support table holds an upper tool immediately above the foil in the station. A double parallelogrammatic linkage has two upper pivots on the support table, two lower pivots on the machine frame, and two upright links pivoted on the upper and lower pivot. A table drive mounted on the frame includes a crank connected to the link for oscillating the link about the lower pivot and thereby reciprocating the support table generally in the transport direction. A lower tool is carried by guides on the support table for only vertical movement relative to the support table. A tool drive mounted on the frame includes another crank connected to the lower tool for reciprocating the lower tool vertically relative to the support table.

8 Claims, 6 Drawing Sheets

BLISTER-FOIL PACKAGING MACHINE

FIELD OF THE INVENTION

The present invention relates to a blister-foil packaging machine. More particularly this invention concerns an apparatus that can apply a top foil over the filled pockets of a continuously moving blister strip.

BACKGROUND OF THE INVENTION

It is standard to package medicaments, foodstuffs, and the like in blister packs. To this end a thermoplastic foil is formed with an array of blisters or pockets, making it into a blister strip that is moved continuously along a production path with the pockets open upward. At an upstream region a product is put into each of the pockets. Then a top foil or cover sheet is applied over the planar upper face of the filled blister strip, typically by heat-sealing, to hermetically seal the pockets. The thus capped blister strip is then cut into pieces each having one or more blisters. See, for example, U.S. Pat. Nos. 4,329,830 and 5,802,804 respectively of Omori and Esposti.

As in any mass-production operation, it is essential that the continuous movement of the workpiece not be interrupted, in fact its speed should remain rock steady during the pocket-forming, filling, capping, and cutting operations, and in fact the travel speed should be as high as the various operations permit. Only once the filled and capped strip has been cut into pieces can is there no more need to transport the workpiece at a constant rate.

While it is relatively simple to form pockets in the strip and fill the pockets while it is moving by simple arrangements having rollers, when it comes to capping and/or cutting the strip transversely, it is essential to move the capping and/or cutting tools longitudinally synchronously with the strip. Above-cited U.S. Pat. No. 4,329,830 of Omori proposes a complex system that allows the pocket-forming tools to be shifted synchronously with the workpiece as the pockets are formed, but the mechanism here is quite complex and not able to compensate for subtle variations in the strip, such as thermal expansion or shrinking. Similarly, U.S. Pat. No. 4,892,019 of Kogane proposes a cutter usable for photographic film that can work on the fly, but that is also very complex, and that is not really adaptable to use with a blister strip.

OBJECTS OF THE INVENTION

It is therefore an object of the present invention to provide an improved blister-foil packaging machine.

Another object is the provision of such an improved blister-foil packaging machine that overcomes the above-given disadvantages, in particular that allows tools to be synchronized with the continuously moving blister strip by means of simple mechanisms that can be operated in accordance with actual conditions.

SUMMARY OF THE INVENTION

A lower foil formed with a plurality of upwardly open filled pockets passes in a horizontal transport direction at a constant transport speed through a work station of a machine frame. A support table holds an upper tool immediately above the foil in the station. A parallelogrammatic linkage has at least one upper pivot on the support table, at least one lower pivot on the machine frame, and at least one link pivoted on the upper and lower pivot. A table drive mounted on the frame includes a crank connected to the link for oscillating the link about the lower pivot and thereby reciprocating the support table generally in the transport direction. A lower tool is carried by guides on the support table for only vertical movement relative to the support table. A tool drive mounted on the frame includes another crank connected to the lower tool for reciprocating the lower tool vertically relative to the support table.

Such a parallelogrammatic linkage driven by a crank is extremely simple and easy to control. While it admittedly does not create perfect straight-line movement of the support table, when the links are long enough any vertical movement during the horizontal displacement, since in reality the upper pivot moves through an arc centered on the lower pivot, is minor and can easily be accommodated by the workpiece. Using such crank-type drives to reciprocate the support table horizontally and the lower tool vertically reduces the number of parts greatly while still allowing these two movements to be controlled independently of each other.

According to the invention the linkage includes two such upper pivots, two such lower pivots, and two such links. Thus there is a four-point double parallelogrammatic linkage that will ensure very stable positioning of the support table which will remain perfectly horizontal at all times, as the upper pivots will lie in a plane perfectly parallel to that of the lower pivots, presuming the links are of the same lengths. Each link includes a pair of horizontally spaced vertical elements each having an upper end pivoted at the respective upper pivot and a lower end pivoted at the respective lower pivot and at least one horizontal element fixed between the respective vertical elements. These elements are all unitary with one another.

In accordance with the invention each drive includes an eccentric drive wheel on which the respective crank is pivoted. The drive wheels are rotatable about respective vertically spaced axes that extend generally perpendicular to the direction. The axis of the tool drive is below the axis of the table drive.

To be able to compensate for workpiece creep and/or thermal expansion and contraction of the foil, a sensor is provided upstream of the station for detecting the pockets of the foil. A controller connected between the sensor and the drive synchronously operates the drives in accordance with a detected transport speed of the pockets and detected positions of the pockets.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
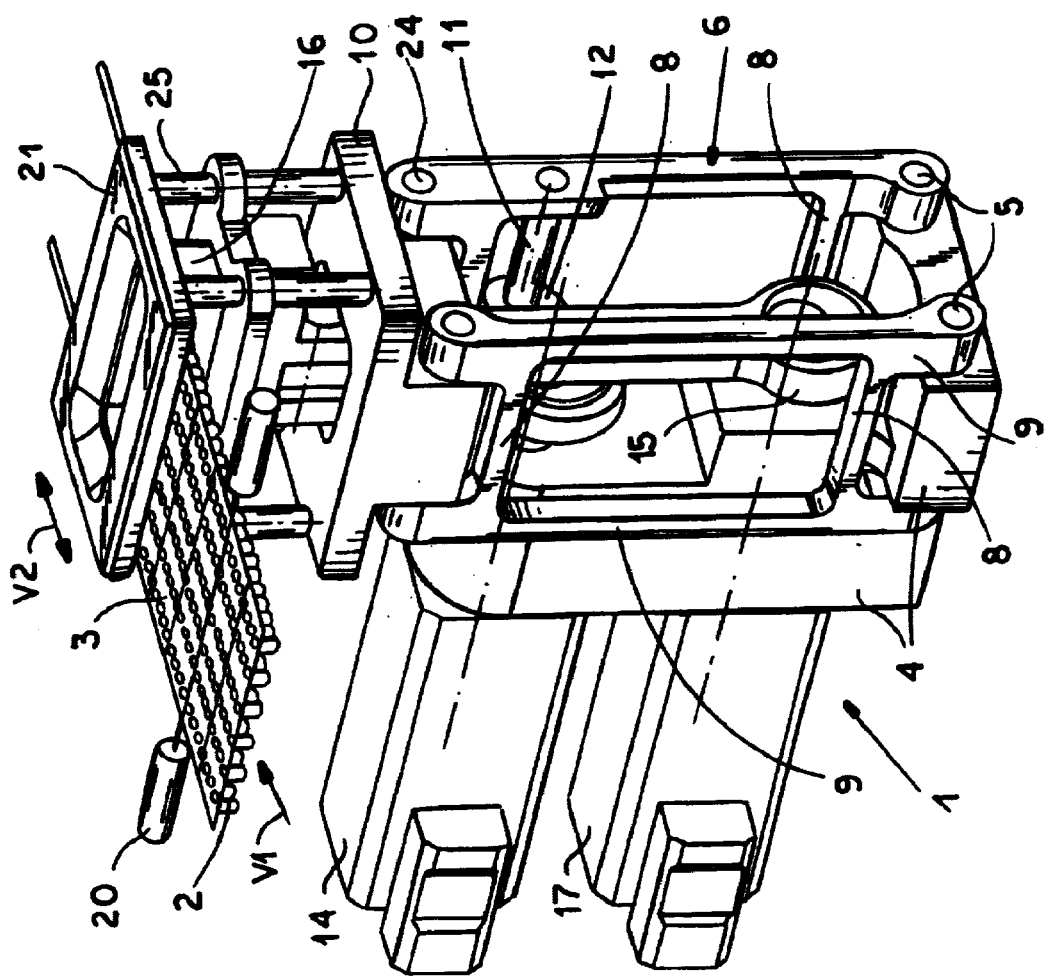
FIG. 1 is a perspective view of the apparatus according the invention.
Figure 2:
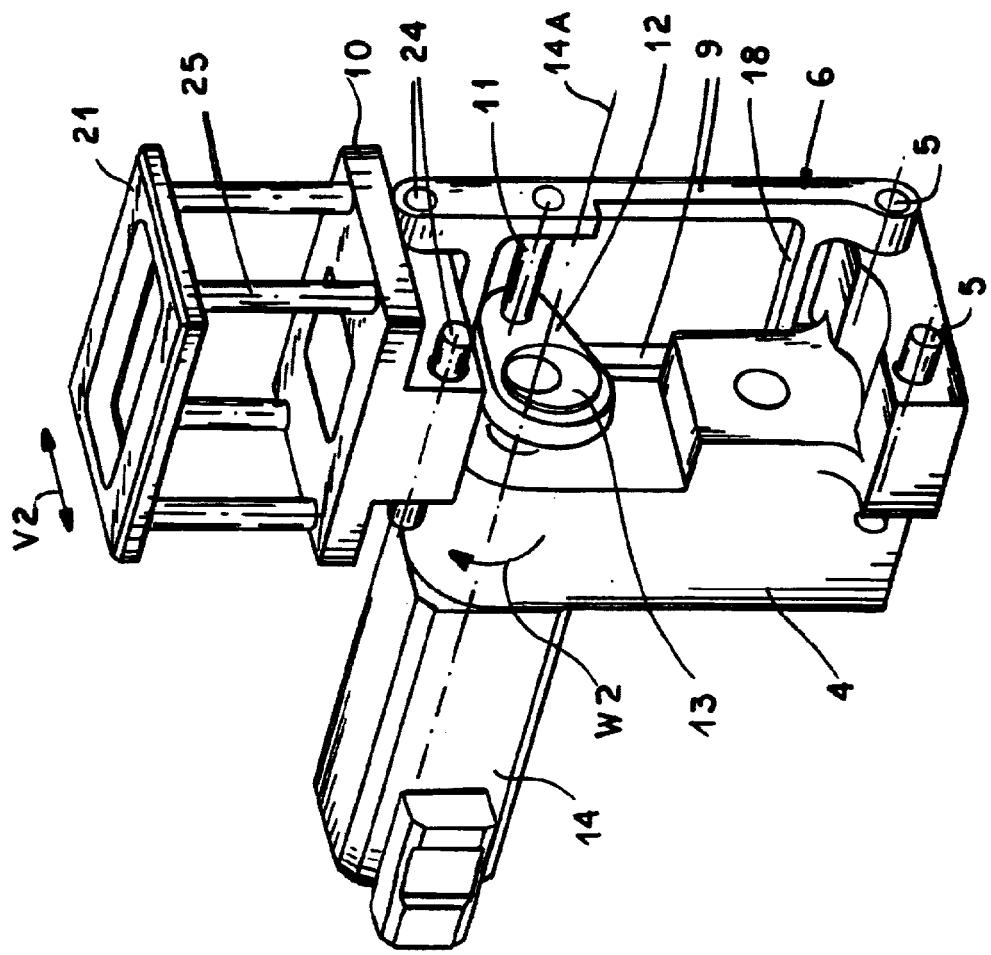
FIG. 2 is a perspective view of the structure of FIG. 1 with some parts, principally those relating to vertical reciprocation, removed for clarity of view.
Figure 3:
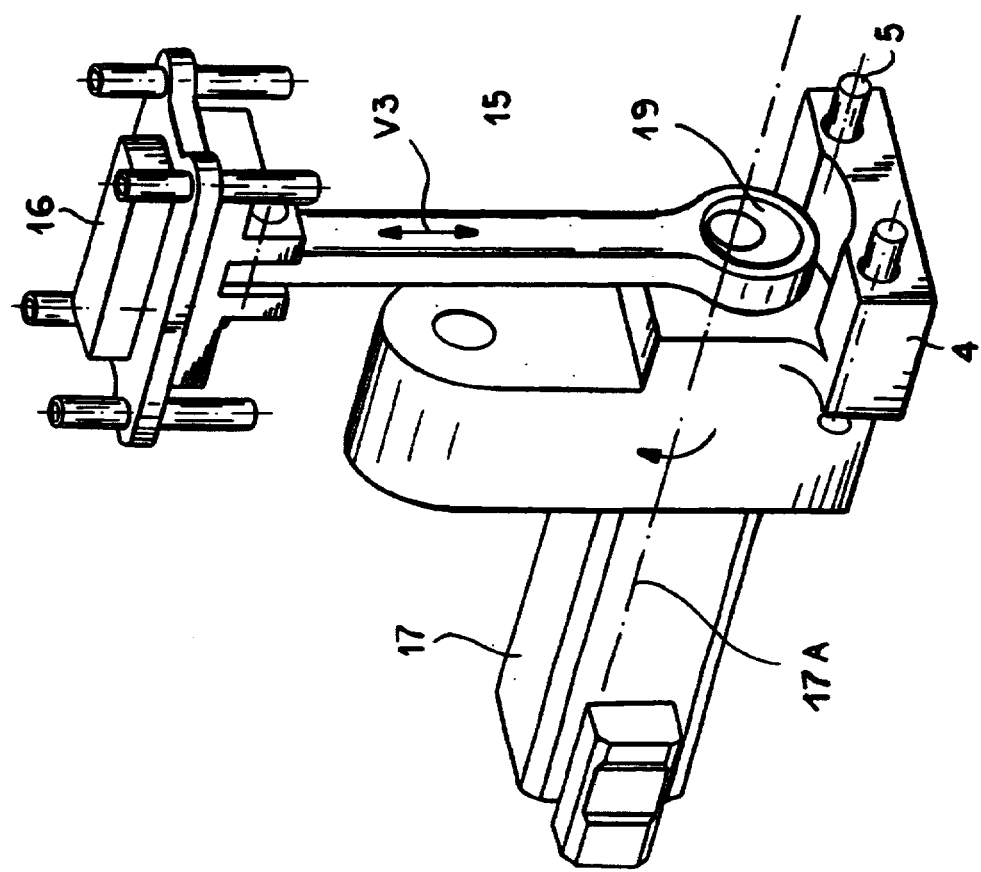
FIG. 3 is a perspective view of the structure of FIG. 1 with some parts, principally those relating to horizontal reciprocation, removed for clarity of view.
Figure 4:
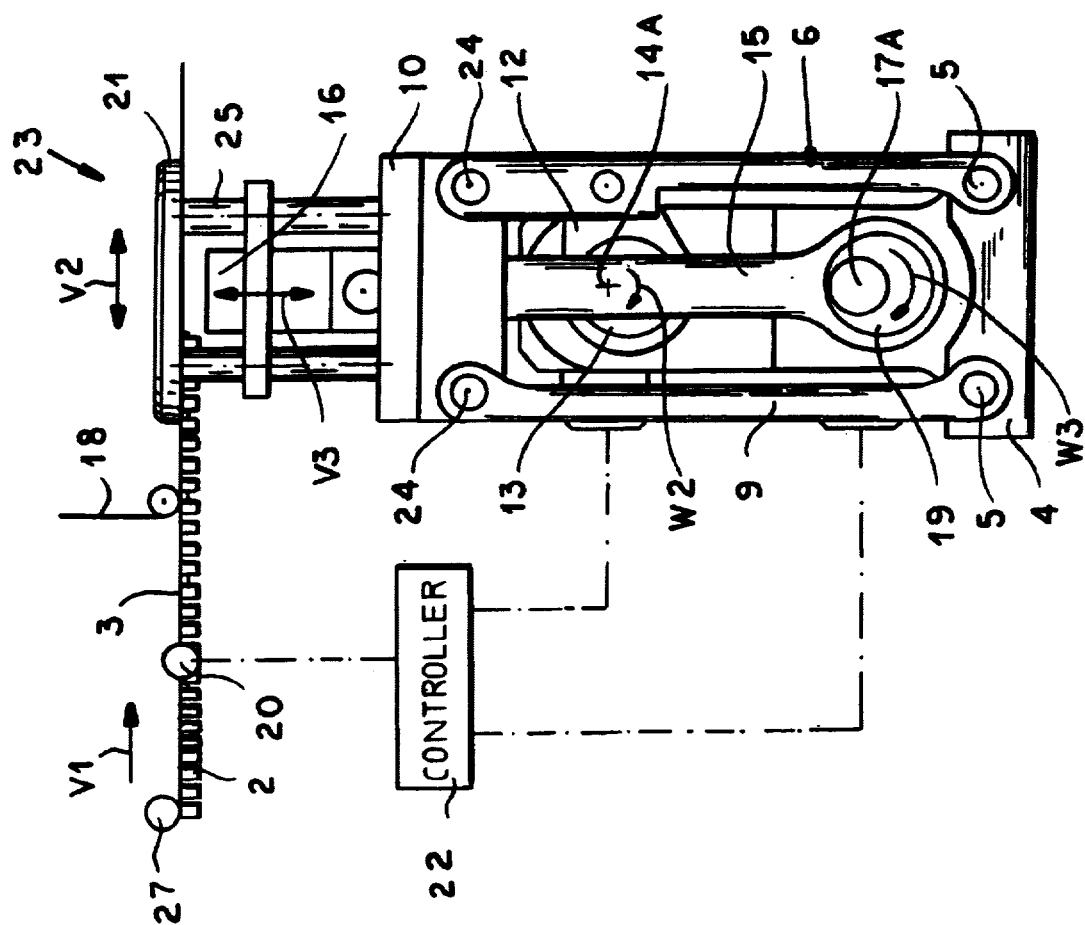
FIG. 4 is a partly schematic side view of the apparatus.
Figure 5:
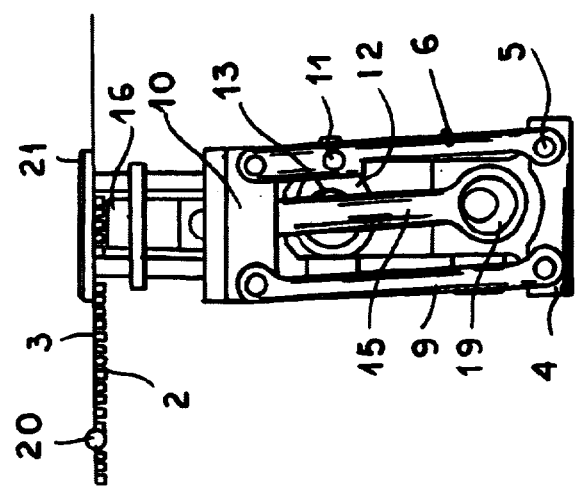
FIGS. 5 through 9 are small-scale side views illustrating the successive positions assumed by the apparatus according to the invention.
Figure 6:
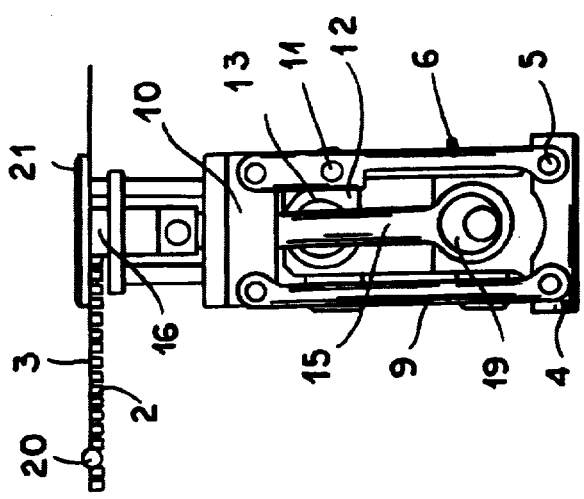
Figure 7:
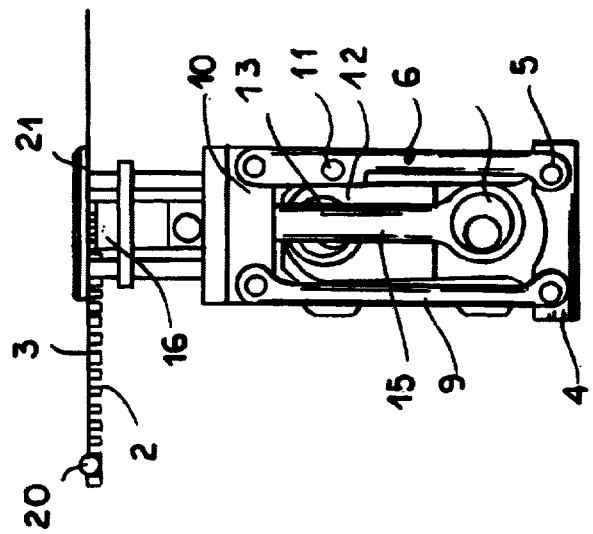
Figure 9:
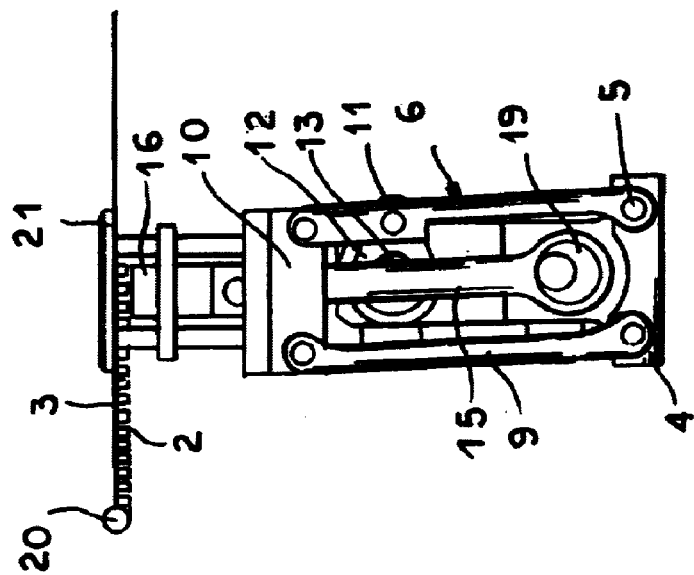
Figure 8:
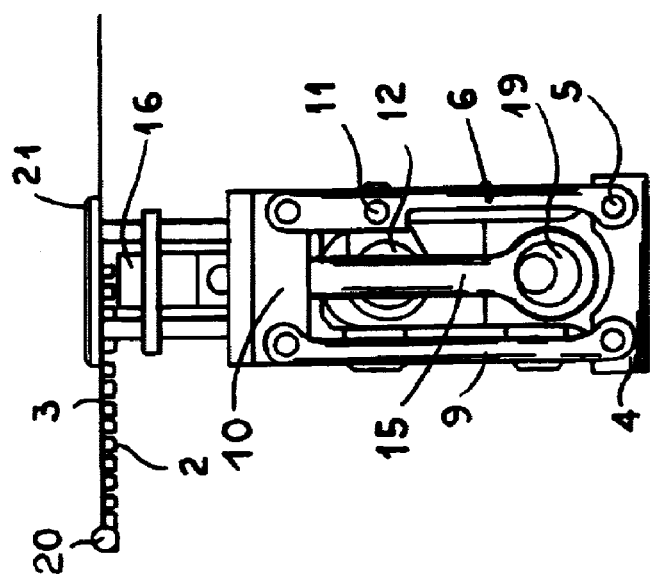

As seen in FIGS. 1 to 4, an apparatus 1 according to the invention works with a lower foil 3 formed with an array of upwardly open filled pockets or blisters 2 and an upper foil 18, both advanced through a work station 23 in a horizontal transport direction V1 at a constant speed by a drive illustrated schematically in FIG. 4 at 27. In the station 23 the foils 3 and 18 are gripped vertically between the blisters 2 between a lower face of an upper tool 21 and a lower tool 16 that can serve to bond the two foils 3 and 18 together and/or to cut groups of the blisters 2 from the foils 3 and 18.

The apparatus 1 has a stationary machine frame 4 defining the work station and forming two horizontal base pivots or axes 5 that are parallel and perpendicular to the direction V1 and that are spaced apart in the direction V1 below the station 23. A support plate or carriage 10 is supported on these two pivots 5 by a double parallelogrammatic linkage comprised of two rigid links 6 each unitarily formed with a pair of vertically spaced horizontal elements 8 extending perpendicular to the direction V1 between a pair of vertical elements 9 spaced apart transversely of the direction and each having a lower end pivoted at 5 and an upper end pivoted on the table 10 at one of a pair of pivots or axes 24 extending horizontally perpendicular to the direction V1 and spaced apart in the direction V1.

A pin 11 extending horizontally perpendicular to the direction V1 is seated in two of the upright elements 9 of the downstream link 6 and carries an end of a crank 12 fitted over an eccentric disk or wheel 13 rotatable in a direction W2 about an axis 14A by a drive 14 fixed to the frame 4. The axis 14A is horizontal and perpendicular to the direction V1 so that, as the wheel 13 is rotated about its axis 14A, the support plate 10 will be reciprocated as shown by arrow V2 mainly parallel to the direction V1. The vertical spacing between the axes 5 and 24 is much greater than the horizontal spacing between them, so that there is little vertical movement of the support plate 10 as it reciprocates in the travel direction V1. The upper tool 21 is fixed by upright tie rods 25 to the table 10.

The lower tool 16 is vertically reciprocal on these tie rods 25 as shown by arrow V3 and is pivoted on the upper end of a crank arm 15 whose lower end is fitted over an eccentric disk or wheel 19 rotated about an axis 17A by another drive 17 mounted on the frame 4. Thus rotation of the disk 19 by the drive 17 in direction W3 will vertically reciprocate the tool 16 as shown by the arrow V3.

A controller 22 is connected to a sensor 20 provided upstream in the direction V1 from the work station 23 and to the two drives 14 and 17. It operates these drives 14 and 17 so that movement of the support plate 10 with the two tools 16 and 21 in the direction V1 is synchronous with the movement of the foils 3 and 18. In addition it ensures that the lower tool 16 is only raised into contact with the foil 3 when the pockets 2 are positioned such that they will be cleared by this tool 16. In this manner creep of the workpiece 3 caused by slipping or thermal expansion is compensated for on the fly and damage to the contents of the pockets 2 is ruled out.

We claim:
1. An apparatus comprising:
a machine frame defining a work station;
means for passing a lower foil formed with a plurality of upwardly open filled pockets through the station in a horizontal transport direction at a generally constant transport speed;
a support table holding an upper tool immediately above the foil in the station;
a parallelogrammatic linkage having
at least one upper pivot on the support table,
at least one lower pivot on the machine frame, and
at least one link pivoted on the upper and lower pivot;
table drive means mounted on the frame and including a crank connected to the link for oscillating the link about the lower pivot and thereby reciprocating the support table generally in the transport direction;
a lower tool;
guides on the support table, slidably carrying the lower tool, and constraining the lower tool only to vertical movement relative to the support table; and
tool drive means mounted on the frame and including another crank connected to the lower tool for reciprocating the lower tool vertically relative to the support table.

2. The apparatus defined in claim 1 wherein the linkage includes two such upper pivots, two such lower pivots, and two such links.

3. The apparatus defined in claim 2 wherein each link includes a pair of horizontally spaced vertical elements each having an upper end pivoted at the respective upper pivot and a lower end pivoted at the respective lower pivot.

4. The apparatus defined in claim 3 wherein each link further includes at least one horizontal element fixed between the respective vertical elements.

5. The apparatus defined in claim 1 wherein each drive means includes an eccentric drive wheel on which the respective crank is pivoted.

6. The apparatus defined in claim 5 wherein the drive wheels are rotatable about respective vertically spaced axes that extend generally perpendicular to the direction.

7. The apparatus defined in claim 6 wherein the axis of the tool drive means is below the axis of the table drive means.

8. The apparatus defined in claim 1, further comprising sensor means upstream of the station for detecting the pockets of the foil; and
control means connected between the sensor means and the drive means for synchronously operating the drive means in accordance with a detected transport speed of the pockets and detected positions of the pockets.

* * * * *